March 19, 1957   T. R. HARRISON ET AL   2,785,860
MEASURING AND CONTROLLING APPARATUS USING
A RADIATION PYROMETER
Filed May 14, 1949                          3 Sheets-Sheet 1

*INVENTOR.*
THOMAS R. HARRISON
WILLIAM H. WANNAMAKER JR
BY
Arthur H. Swanson
ATTORNEY.

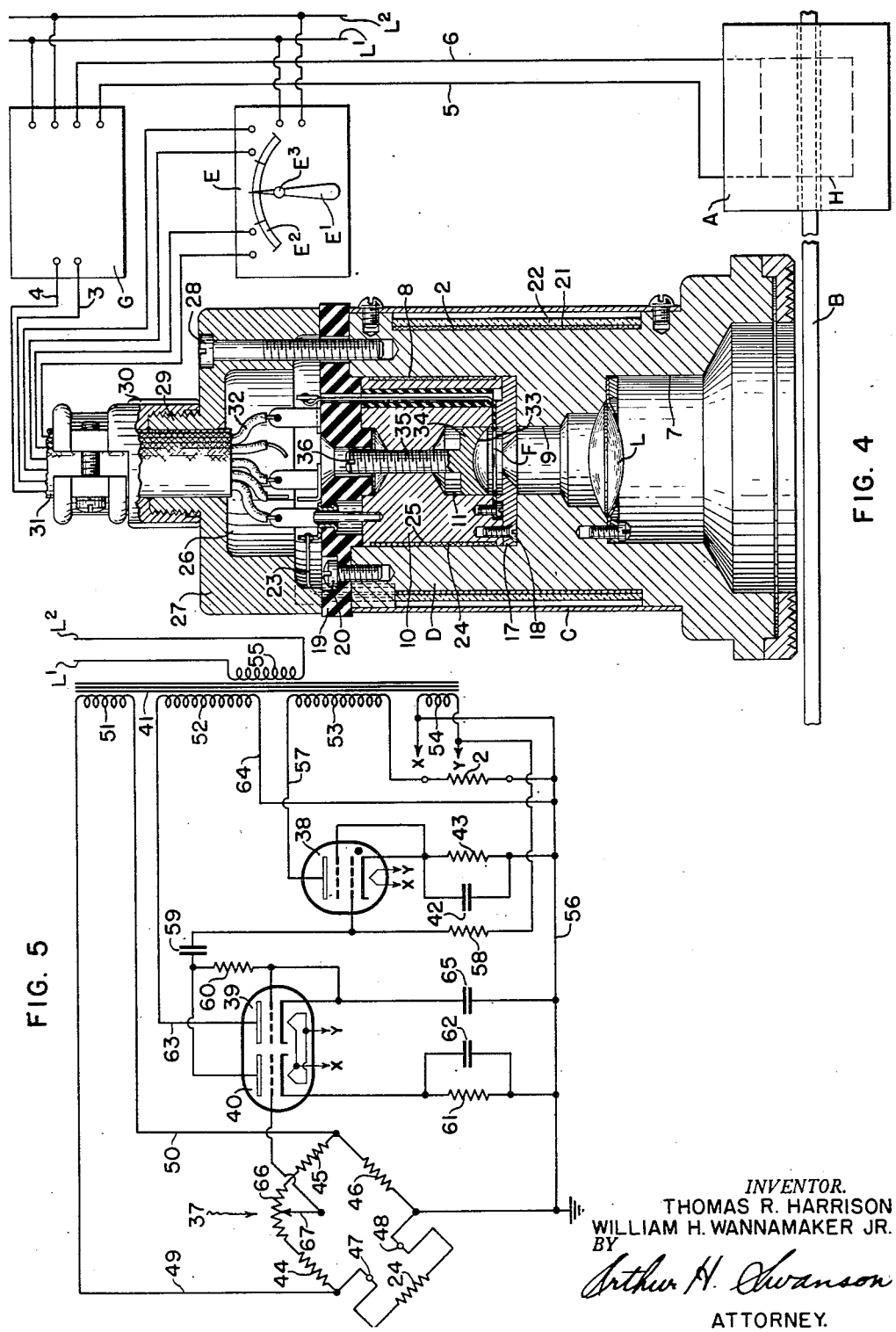

March 19, 1957  T. R. HARRISON ET AL  2,785,860
MEASURING AND CONTROLLING APPARATUS USING
A RADIATION PYROMETER
Filed May 14, 1949  3 Sheets-Sheet 3

INVENTOR.
THOMAS R. HARRISON
WILLIAM H. WANNAMAKER JR
BY
ATTORNEY.

United States Patent Office 2,785,860
Patented Mar. 19, 1957

2,785,860

MEASURING AND CONTROLLING APPARATUS USING A RADIATION PYROMETER

Thomas R. Harrison, Wyncote, and William H. Wannamaker, Jr., Flourtown, Pa., assignors to Minneapolis-Honeywell Regulator Company, Minneapolis, Minn., a corporation of Delaware Application May 14, 1949, Serial No. 93,212

10 Claims. (Cl. 236—15)

The general object of our present invention is to provide improved apparatus for measuring and controlling the temperature of a heated body. A primary object of the invention is to provide a novel apparatus for measuring and controlling the temperature of work which is being passed continuously through a furnace or other apparatus regulable to give the work an approximately constant predetermined temperature.

A specific object of the invention is to provide a furnace for continuously heating to a predetermined temperature of 500° C., for example, aluminum strip material or other work which is being moved through the furnace, with control apparatus including a radiation pyrometer which is of such form and is so associated with the work heated in and passing away from the furnace as to produce and measure an approximately true black body heat radiation, accurately indicative of the temperature of the material strip, even though the emmissivity of the work is variable or unknown.

A more specific object of the invention is to provide apparatus for controlling the temperature to which work is continuously heated in a furnace, which is characterized by the maintenance of a pyrometer body structure and the reference junctions of a thermopile mounted in said structure at a predetermined constant temperature, and by the adjustment of the heating effect of said furnace, in response to variations in a measured heat radiation from work moving through the furnace, as required to maintain the temperature of the work approximately equal to said predetermined temperature.

To measure and control the temperature of work continuously moving through and heated in a furnace, we provide a radiation pyrometer comprising a relatively massive body of good heat conducting material and formed with a cavity extending into the body from one side thereof, and with a chamber in which a thermopile or other heat sensitive device, such for example, as a bolometer, is mounted, and with a passage through which heat rediation is transmitted to the radiation receiving portion of the heat sensitive element, for example, the radiation receiving junctions of the thermopile, from said cavity. In using the pyrometer just described in accordance with the present invention, we arrange the pyrometer body with the open side of the cavity alongside and in close proximity to a work piece portion which has been heated in and is passing away from the furnace so that substantially all heat radiated into the cavity is radiated by the pyrometer body or by the portion of the work piece alongside the cavity.

Under such conditions, when the work piece portion alongside the cavity is at the same temperature as the pyrometer body, the heat radiation to the thermopile will be approximately true black body radiation and the thermopile radiation receiving and reference junctions will then be at the same temperature. In consequence, the thermopile output voltage will then be zero, and the temperature of the pyrometer body will be an accurate measure of the temperature of the work piece portion alongside the pyrometer cavity. Under such conditions, the substantial variations in the emissivity of such work pieces as aluminum strips do not prevent the work piece temperature measurements from being suitably accurate. When the temperature of the work piece portion alongside the cavity differs from the pyrometer body temperature, the thermopile will no longer be subjected to approximately true black body radiation. This difference between the two temperatures will result in the development of an output voltage by the thermopile. In normal operation such temperature difference may be rapidly eliminated or greatly reduced by a corrective adjustment of the heat supply to the furnace, automatically dependent in magnitude and direction on said thermopile output voltage. Error due to difference between the pyrometer body and work piece portion temperatures may be minimized by increasing the reflectance of the walls of the cavity space of the pyromter body in known manner, as by using highly polished materials of suitable composition, and serrations can be provided to entrap any radiation in the cavity space and to exclude stray radiation from the said cavity space.

In the preferred mode of controlling the temperature of the work being heated, the temperature of the pyrometer body is continuously measured, and the measurements are used to regulate the supply of heat to said body as required to maintain said body at the predetermined constant temperature at which it is desired to maintain the work. When the work and pyrometer body are at temperatures which are equal, the radiation receiving and reference junction temperatures of the thermopile element of the pyrometer are equal, and the thermopile voltage is equal to zero. When the pyrometer body and work temperatures are different, there is a difference between the temperatures of the thermopile radiation receiving and reference junctions. That difference results in a thermopile voltage which is utilized to vary the temperature of the furnace in which the work is heated, so as substantially to eliminate said difference.

The various features of novelty which characterize our invention are pointed out with particularity in the claims annexed to and forming a part of this specification. For a better understanding of the invention, however, its advantages, and specific objects attained with its use, reference should be had to the accompanying drawing and descriptive matter in which we have illustrated and described a preferred embodiment of the invention.

Of the drawings, Fig. 1 is a diagrammatic illustration of an embodiment of the invention;

Fig. 4 illustrates another embodiment of the invention;

Fig. 5 is a wiring diagram illustrating the automatically controlled heating system for the radiation pyrometer body of Fig. 4.

Figure 1:
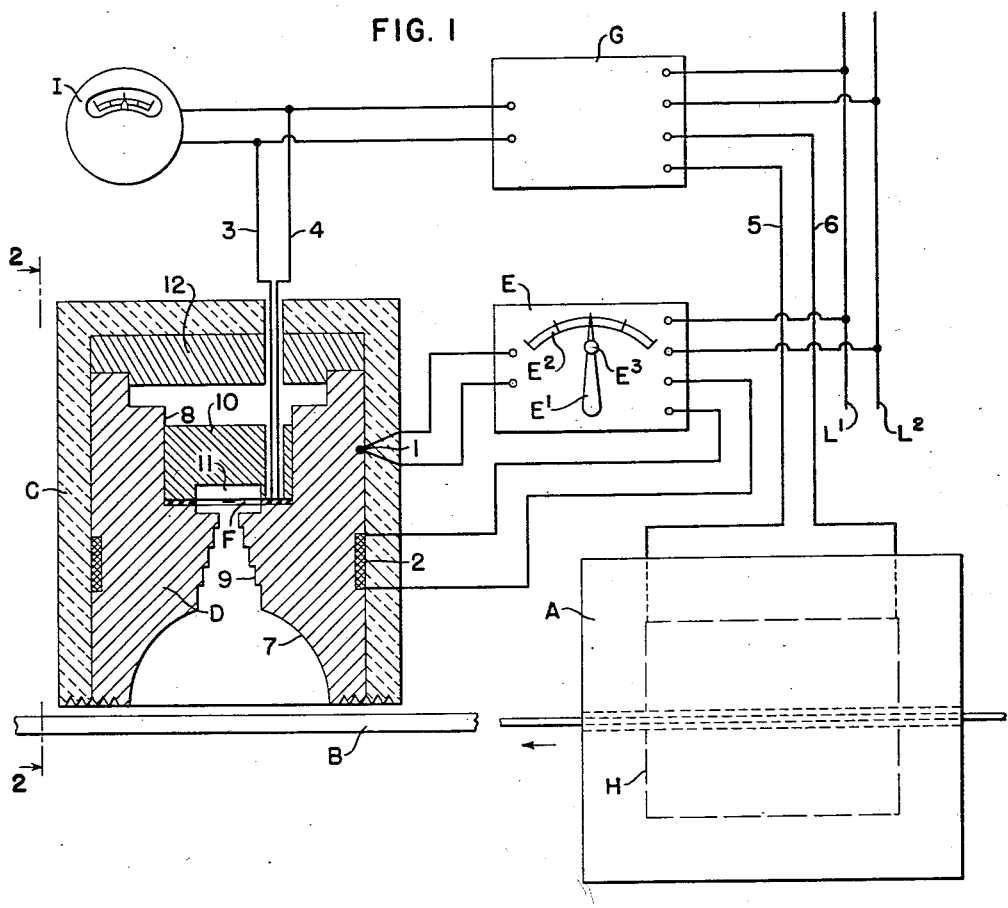
Figure 2:
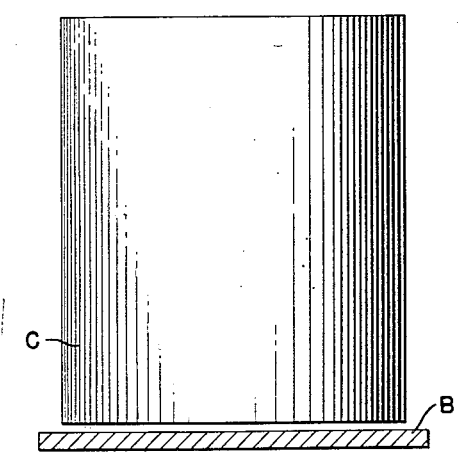
Fig. 2 is a section on the line 2—2 of Fig. 1.

In the embodiment of the invention diagrammatically illustrated by way of example in Fig. 1, A designates an electrical heating furnace, which may be an induction furnace or other furnace suitable for use in continously heating a strip B of aluminum or other metal. The strip B is continuously advanced in the direction of the arrow through the heater by feed rolls or other feeding mechanism which may be of well known type and need not be illustrated herein. As the strip B moves away from the heater A, its temperature is measured by a radiation pyrometer C. The latter comprises a relatively massive metallic pyrometer body D, which, in accordance with the present invention, is normally maintained at a predetermined constant temperature by means of a controller E. The latter comprises measuring means connected to a thermocouple 1 having its radiation receiving junction in contact with the body D for measuring the temperature of said body. The controller E also comprises a current regulator which supplies current to a heating coil 2, surrounding the body D, at a rate depending on the thermocouple voltage so as to maintain said body at the predetermined temperature to which the strip B is desirably heated in the furnace A.

The controller E may be of any usual or available type, such as a millivoltmeter or potentiometer controller, operable to produce control effects in response to variations in a thermocouple voltage. As diagrammatically shown in Fig. 1, the controller E includes an indicator E' which can be manually adjusted along the control point scale $E^2$, as by grasping the knob $E^3$ provided on the indicator E', to thereby adjust the controller so that it will maintain the pyrometer body at the temperature indicated by the position of the pointer E'. The controller E is connected to current supply conductors L' and $L^2$ from which the controller E derives the current supplied to the heating coil 2.

The actual temperature of the strip B is measured, as hereinafter explained, by means of a thermopile F included in the pyrometer E, and having its terminals 3 and 4 connected to a controller G. The latter is connected to and energized by the supply conductors L' and $L^2$, and supplies current through conductors 5 and 6 to an electric heating element included in the furnace A and shown diagrammatically as a coil H. As shown diagrammatically in Fig. 1, the thermopile terminals 3 and 4 are also connected to an indicator I which provides an indication of the extent of departure, if any, of the temperature of the strip B from the normal or predetermined temperature of said strip.

The controller G may be of any usual or suitable type such as a millivoltmeter or potentiometer controller, arranged to produce control effects in response to changes in the magnitude and direction of a reversible control quality. As hereinafter explained, when the work strip B is at the temperature of the pyrometer body D, the potential difference between the thermopile terminls 3 and 4 is equal to zero. In practice, the controller G is advantageously so calibrated that when the work strip is at the temperature of the pyrometer body, the current supplied to the coil H by the conductors 5 and 6 will be that required to maintain the predetermined temperature of the body B under operating conditions then assumed to be normal. With the controller G so calibrated, a change in operating conditions, such as a decrease or increase in the mass of the strip B per unit of length, which decreases or increases the temperature of the strip B, results in a voltage difference in one direction or the other between the conductors 3 and 4. In response to the voltage difference, the controller G varies the current supplied to the coil H so as to quickly return the temperature of the strip B to approximate equality with the temperature of the pyrometer body D.

In the form shown by way of example in Fig. 1, the pyrometer body D is formed with a cavity 7 extended into the body D from its side adjacent the strip B and in close proximity to the latter and concave toward the strip. Desirably, and as shown, the cavity is generally hemispherical in shape, though its precise configuration is not important. At its side remote from the strip B, the body D is formed with a chamber 8 shown as circular in cross-section and coaxial with the cavity 7. The chambers 7 and 8 are in communication through a passage 9 which is coaxial with said chambers, and advantageously decreases in cross-section as the distance from the chamber 7 increases.

As shown, the inner end portion of the chamber 8 receives, and is substantially filled by a block 10 of aluminum or other metal of good heat conductivity. The block 10 is formed with a central recess 11 in its side adjacent to chamber 7, and is thus spaced away from the central portion of the thermopile F. The latter has its outer portion clamped between portions of the members 10 and D. The outer end of the chamber 8 is closed by an end head 12 which overlaps the annular portion of the member D surrounding the outer end of the chamber 8.

Figure 3:
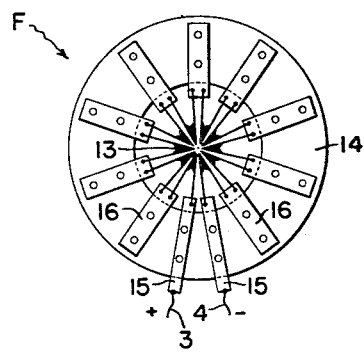
Fig. 3 is a detailed view of the thermopile employed in the radiation pyrometer employed in Fig. 1.

The termopile F may well be of the known type shown in Fig. 3 and characterized by its inclusion of a plurality of V shaped thermocouples 13 spaced around the pyrometer axis. Each thermocouple 13 has its two outer leg portions in the form of relatively short wires, each of which is connected to a different one of a plurality of metal strips 15 and 16 extending radially away from the pyrometer axis and attached to an annular mica sheet 14. The two adjacent wire legs of two adjacent thermocouples 13 are connected to metal strips 15 which form terminal portions of the thermopile. Each other pair of adjacent legs of adjacent thermocouples are connected both electrically and mechanically to a corresponding metal strip 16. The strips 15 and 16 form the reference junctions of the thermopile, the radiation receiving junctions being formed by the inner junctions of each thermocouple 13. The strips 15 and 16, the mica annulus 14 and insulation covering the metal strips are clamped between the annular portion of the block 10 surrounding the recess 11 and the annular bearing shoulder portion of the member D adjacent the peripheral wall of the chamber 8. The insulation covering the metal strips may comprise an annular mica sheet similar to the sheet 14. As will be apparent, the thermocouples 13 are connected in series between the terminal strips 15, respectively connected to the conductors 3 and 4.

In the normal operation of the apparatus diagrammatically shown in the drawings, the pyrometer body D is maintained at the predetermined temperature by means of the thermocouple 1, heating coil 2, and controller E. With the thermopile F mounted in the pyrometer as described, the reference junctions of the different thermocouples 13 will be maintained at substantially the temperature of the pyrometer body continuously in normal operation. When the temperature of the work strip B is substantially equal to the temperature of the pyrometer body D, as it normally will be most of the time, approximately true black body radiation conditions will be maintained in the cavity 7, passage 9, adjacent portion of the chamber 8, and recess 11, and since the radiation receiving and reference junctions of the thermopile are both located in the pyrometer body, the thermopile radiation receiving and reference junction temperatures will then be equal. The maintenance of the black body radiation condition during periods in which the temperatures of the pyrometer body and work strip are equal does not depend upon the emissivity of the work strip B, and thus zero output voltage of the thermopile is an indication that the work strip B and the pyrometer body D are at the same temperature.

In respect to the form of the thermopile F and its mounting in the pyrometer body D, the pyrometer illustrated in Fig. 1 may be of the type and general form disclosed in the application, Serial No. 658,163, filed March 29, 1946, by Thomas R. Harrison, one of the applicants herein.

In said application, Serial No. 658,163, a lens is mounted in the pyrometer body to focus, on the central portion or radiation receiving junction of the thermopile of said application, the heat radiation coming to the lens from the object whose temperature is being measured. With the black body radiation conditions which normally exist in the use of the pyrometer C illustrated in Fig. 1 of the present application, a lens is not required but may be embodied therein, if desired.

The pyrometer and the temperature control mechanism for maintaining the temperature of the pyrometer body at a predetermined constant magnitude may advantageously be of the type and general form disclosed in Figs. 4 and 5. No claim is made herein on the pyrometer of Fig. 4 and the temperature control mechanism of Fig. 5 per se, as that pyrometer was invented by Clarence A. Dyer and is claimed in his application, Serial No. 725,847, filed February 1, 1947, now Patent No. 2,562,538, and as that temperature control mechanism was invented by William H. Wannamaker, Jr., and James C. Mouzon and is claimed in their application, Serial No. 14,416, filed March 12, 1948, now Patent No. 2,661,454. Fig. 5 illustrates a circuit diagram of the temperature control mechanism utilized in the arrangement of Fig. 4 for maintaining the temperature of the pyrometer body at a predetermined constant magnitude. Where the parts in Figs. 4 and 5 correspond to parts which appear in the embodiment of Fig. 1, the same reference numerals have been employed to identify them.

The pyrometer C of Fig. 4 includes a resistance heating coil 2 for heating the pyrometer body D. The body D, as in Fig. 1, is a relatively massive metallic part formed of aluminum or other metal of good heat conductivity, and is chambered to provide a space in which a thermopile F and a lens L are mounted. Heat radiations received from the moving metal strip B are received and focused on the radiation receiving junctions of the thermopile F by the lens L.

As shown, the thermopile F is surrounded by and forms a part of an assembly unit comprising a cylindrical block 10, an annular thermopile retaining element 17, secured by screws 18 to the front end of the block 10, and a terminal disc 19 secured to the side of block 10 remote from the thermopile F. The block 10 and the retaining member 17 are formed of aluminum or other good heat conducting material, and the disc 19 is formed of insulating material such as Bakelite or a ceramic material. The unit including the members 10, 17 and 19 is adapted for insertion in and removal from a cylindrical chamber 8 extending into the pyrometer body D from its rear and coaxial with the lens L, and is secured in position by screws 20. The chamber space 8 is larger in diameter than the chamber space 9 which extends between the space and the lens L.

The heating coil or resistor 2 is wound in a grooved portion 21 provided in the body D and is covered by a layer of asbestos insulation 22. The ends of the coil 2 pass through the body D as insulated conductors, one of which is shown at 23, and terminate at respective terminal parts on the member 19.

A thermometer resistance 24 is wound in a grooved portion 25 of the block 10, and is responsive to the temperature of the body D. The ends of the thermometer resistance 24 pass through the body D as insulated conductors and terminate at respective terminal parts on the member 19.

The previously mentioned terminal parts serve to connect conductors at the opposite sides of the member 19, and are mounted in the latter and extend into a chamber space 26 formed in a cap-shaped cover or end chamber 27. The latter is detachably secured to the rear end of the body D by bolts 28 which extend through the cover 27 and through registering openings in the member 19 and are secured into threaded sockets formed in the body D. The cover 27 is formed with an axial passage surrounded by an externally threaded tubular boss 29 engaged by a cable clamp 30 for anchoring in place the body of a cable 31 extending into the chamber space 26. The end of each of the conductors 32 included in the cable 31 is connected to a corresponding one of the terminal parts.

The thermopile F may be similar in type and form to the thermopile illustrated and described in detail in connection with Fig. 3.

The chamber 11, formed in the front end portion of the block 10, receives a mirror formed by the polished concave front end surface 33 of a stainless-steel mirror body 34. The latter is provided at its rear side with a threaded stem or spindle 35 threaded in and extending through a threaded axial passage formed in the portion of the block 10 at the rear of the chamber 11. The rear end of the stem 35 is formed with a slot or kerf 36, and when the cover 27 is removed, a screw driver may be placed in the kerf 36 to rotate the stem 35 and thereby axially adjust the mirror 33 toward or away from the thermopile F.

In the preferred arrangement for regulating the current flow in the heating resistor 2 in accordance with the temperature of the thermometer resistance 24, illustrated in the circuit diagram of Fig. 5, the resistance 24 forms part of a resistance bridge 37 which controls the firing of an electronic valve 38 which is of the thyratron type and has the heating resistor 2 connected in its output circuit. The means through which the thyratron 38 is controlled comprises an electronic rectifier 39 which supplies anode energizing voltage to an electronic amplifier triode 40 and is energized by an alternating current transformer 41. The transformer 41 also supplies energizing current to the bridge 37 and supplies anode voltage to the thyratron 38. A condenser 42, connected in parallel with a cathode bias resistor 43 in the output circuit of the thyratron 38, cooperates with the other elements of the control system to determine the frequency with which the thyratron 38 is made conductive. The firing frequency of the thyratron 38 is varied as required to provide proportional control of the heat produced by the heating resistor 2 in response to the temperature measured by the thermometer resistance 24.

The thermometer resistance 24 forms one of the four arms of the resistance bridge 37, the other arms being formed by resistors 44, 45, and 46 and a slide wire resistance 66. As shown, one end of the thermometer resistance 24 is connected by a terminal member 47 to one end of the resistor 44, and the other end of the resistance 24 is connected by a terminal member 48 to one end of the resistor 46. The second end of the resistor 46 is connected by the resistor 45 to the second end of the resistor 44 through the slidewire resistance 66. The point at which the thermometer resistance 24 and the resistor 44 are connected constitutes one input terminal of the bridge 37, and the second input terminal of the bridge is formed by the junction point of the resistors 45 and 46.

The input terminals of the bridge 37 are connected by conductors 49 and 50, respectively, to the terminals of a secondary winding 51 of the transformer 41. The transformer 41 has three other secondary windings, 52, 53 and 54, and has a primary winding 55. The primary winding 55 is connected across alternating current supply conductors $L'$ and $L^2$, which, as in the arrangement of Fig. 1, may form part of a power distribution system supplying to the apparatus alternating current of conventional frequency and voltage, for example, 60 cycles per second, and 115 volts.

The heater resistance 2 is connected between a grounded conductor 56 and one terminal of the transformer secondary winding 53. The second terminal of the winding 53 is connected by a conductor 57 to the anode of the thyratron 38. The latter has its cathode connected to ground through the previously mentioned bias resistor 43 and the condenser 42 connected in parallel with said resistor. As shown, the thyratron 38 is of the commercially available type 2050, which has a suitable linear grid-control characteristic. The thyratron 38 has its shield grid connected to its cathode and has its control grid connected through a fixed bias resistor 58 to one terminal of the transformer secondary winding 54. The second terminal of that winding is connected to ground. The control grid of the thyratron 38 is also connected by a coupling condenser 59 to the anode of the amplifier valve 40. The secondary winding 54 supplies cathode heating current to the valves 38, 39 and 40.

The anode of the valve 40 is connected through a load resistor 60 to the cathode of the rectifier valve 39. The cathode of the valve 40 is connected to ground through a cathode bias resistor 61 and a by-pass condenser 62 connected in parallel therewith. The control grid of the valve 40 is directly connected to the output terminal of the bridge 37 at which the slider contact 67 engages the slide wire resistance 66. The second output terminal of the bridge 37, formed by the junction of the thermometer resistance 24 with the bridge resistor 46, is connected to the ground conductor 56. The anode of the rectifier valve 39 is connected by a conductor 63 to one terminal of the transformer secondary winding 52 which has its second terminal connected by a conductor 64 to the ground conductor 56. The cathode of the rectifier valve 39 is connected to ground through a filter condenser 65. The grid of the valve 39 is connected to the cathode thereof.

The control apparatus shown diagrammatically in Fig. 5 provides proportional control of the magnitude of the average current supplied to the pyrometer body heating resistance 2. Thus, in the normal operation of the apparatus, when the temperature of the pyrometer body D is lower than the predetermined normal or control point temperature, current is supplied to the resistor 2 at an average rate which depends upon the extent to which the temperature of the thermometer resistance 24 is below its normal value. The average rate at which heat is supplied to the pyrometer body D depends upon the frequency with which the thyratron 38 is made conductive.

The adjustable slide wire resistance 66 between the bridge resistors 44 and 45 is provided for the purpose of permitting adjustment of the temperature controller shown in Fig. 5 so that it will maintain the pyrometer body D at a desired selected temperature. The slider contact 67 is connected to the control grid of the amplifier valve 40 and is manually adjustable along the length of the slide wire resistance 66. The slider contact 67 is mechanically connected to the indicator E', as seen in Fig. 4, and is adjusted along the resistance 66 as the indicator E' is adjusted along the control point scale E².

When the temperature of the thermometer resistance 24 is much below the selected value at which it is desired to maintain the temperature of the pyrometer body D, determined by the position of the slider contact 67 along resistance 66, the thyratron 38 fires during one-half of every complete cycle of the alternating current voltage induced in the transformer secondary winding 53. Heating current is then supplied to the heating resistance 2 at the maximum average rate permitted. When the temperature of the thermometer resistance 24 is only slightly below normal, the thyratron 38 is made conductive at a relatively low frequency and current is then supplied to the heating resistance 2 at a minimum average rate. The last mentioned frequency, and the minimum average rate, may be predetermined by the design of the apparatus. In a practically desirable form of the apparatus, the minimum average rate at which a heating current is supplied with the slider contact 67 at or near the middle of the resistance 66 occurs when the thyratron 38 fires once in every five cycles of the supply voltage. The apparatus may be so designed, however, that current will be supplied to the resistance 2 at the minimum rate when the thyratron 38 is fired more or less frequently than once in every five cycles.

Any significant rise in the temperature of the thermometer resistance 24 above that which causes the firing of the thyratron every fifth cycle makes that temperature practically equal to, or somewhat above, the normal or control point temperature, and the thyratron does not resume firing thereafter until the temperature measured by the thermometer resistance 24 again falls below normal.

Successive significant decreases in the temperature of the resistance 24, below that resulting in the thyratron firing every fifth cycle, will progressively increase the firing frequency to once in every four, three, two and single supply voltage cycles. A decrease in the temperature of the resistance 24, below that at which the thyratron 38 fires every cycle, does not change the characteristic of the operation of the apparatus. Ordinarily the apparatus is so designed that under normal operating conditions, the firing of the thyratron once every cycle for a brief period will initiate a progressive increase in the temperature of the thermometer resistance 24 which will normally continue until that temperature is returned to its normal value.

In the apparatus embodiment of the invention illustrated in Fig. 4, as in Fig. 1, the terminals of the thermopile F are connected by conductors 3 and 4 to a controller G. The controller G regulates the supply of heating current through conductors 5 and 6 to an electric heating element H in the furnace A from the alternating current supply lines L' and L². When the work strip B is at the predetermined selected temperature of the pyrometer body D, the potential difference between the thermopile terminals 3 and 4 is equal to zero and the current supplied to the coil H by the controller G will then be that required to maintain the said predetermined temperature of the work strip B. Upon a decrease or increase in the temperature of the work strip B and a resultant voltage difference between the thermopile terminals 3 and 4, the controller G quickly operates to vary the current to the heating coil H as is required to return the temperature of the work strip B to approximate equality with the temperature of the pyrometer body D.

Thus, in the apparatus embodiment of Fig. 4, as in that of Fig. 1, the pyrometer body D is maintained at a predetermined selected temperature, the magnitude of which is dependent upon the adjustment of the indicator E¹ along the scale E². When the temperature of the work strip B is approximately equal to the temperature of the pyrometer body D, the radiation receiving and reference junctions of the different thermocouples 13 of the thermopile F will be at substantially the same temperature and the output voltage of the thermopile F will be zero. Consequently, true black body radiation conditions will then be maintained in the cavity 7, passage 9 and the space between the mirror surface 33 and the thermopile. The maintenance of this black body radiation condition does not depend upon the emissivity of the work strip B and variations in such emissivity do not change the temperature to which the apparatus operates to maintain the work strip B.

In both of the apparatus embodiments of Figs. 1 and 4, the reference junctions of the different thermocouples 13 are arranged in good heat transfer relation with the pyrometer body so that the reference junctions of the thermocouples are maintained at substantially the same temperature as that of the pyrometer body at all times. It will be understood, however, that this thermopile arrangement and construction is not essential to the practice of our present invention and that, if desired, other known forms of thermopile constructions may be utilized. For example, a thermopile construction of the type and general form disclosed in the Quereau Patent Reissue 19,564 may be employed in lieu of the thermopile construction shown in Figs. 1 and 4. The Quereau patent shows a thermopile construction in which the reference or cold junctions are not maintained in good heat transfer relation with the pyrometer body but are suspended so that both the reference and radiation receiving junctions are suspended in the thermopile chamber.

Figure 7:
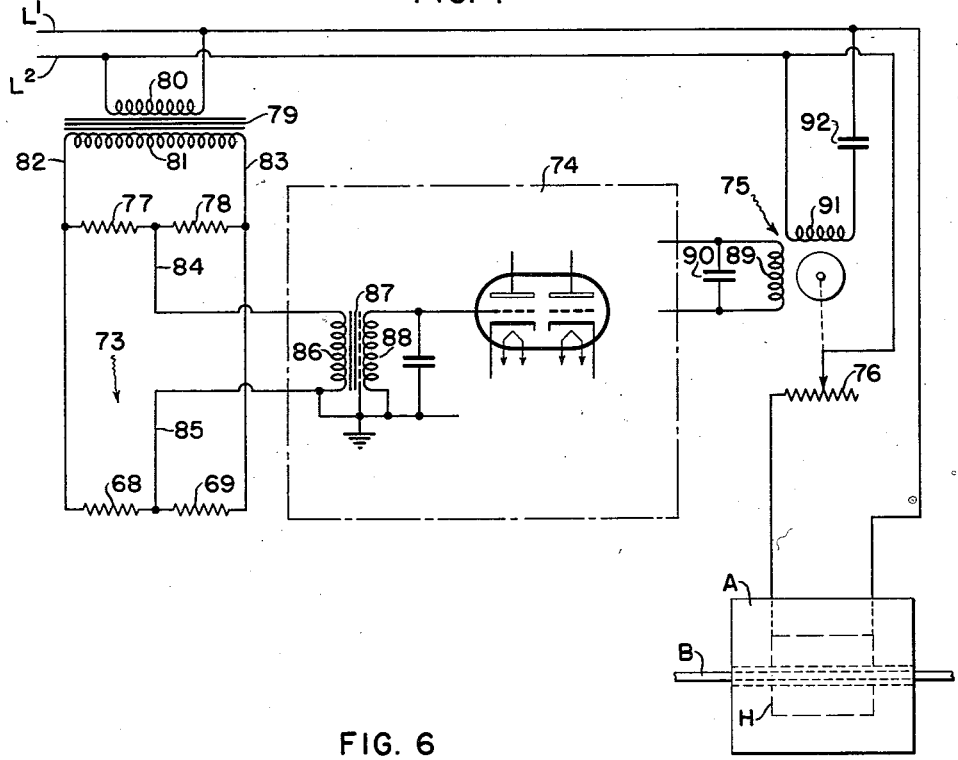
Figs. 6 and 7 illustrate a modification of the arrangement of Figs. 4 and 5 comprising another embodiment of the invention.
Figure 6:
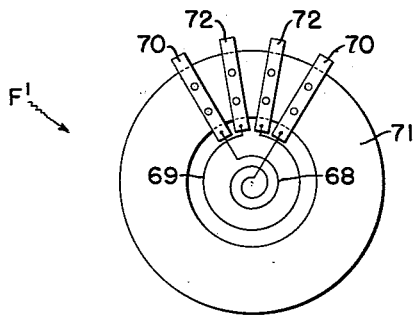

In the practice of the present invention, other forms of heat sensitive devices, such, for example, as bolometers, may be utilized in lieu of the thermopile F to indicate that the body of the pyrometer and the work material are at the same temperature. Figs. 6 and 7 illustrates more or less diagrammatically a modification of the arrangement of Figs. 4 and 5 which comprises such an embodiment of the present invention.

The bolometer type of heat sensitive device may be constructed as shown in Fig. 6 and is characterized by its inclusion of two temperature sensitive resistances 68 and 69. The temperature sensitive resistances 68 and 69 may be formed of any suitable material having either a positive or a negative temperature coefficient of resistance and, for example, may be made of fine nickel wire. Preferably the resistances 68 and 69 are of the same dimensions and made of the same material. As shown, the resistance 68 is coiled in the form of a spiral and comprises the radiation receiving portion of the bolometer. The resistance 69 is utilized as the reference portion of the bolometer.

The two end terminals of the resistance 68 are each connected to an individual metal strip 70 which extends radially from the pyrometer axis and is attached to an annular mica sheet 71 which may be similar to the annular mica sheet 14 shown in Fig. 3. The end terminals of the resistance 69 are each connected to an individual metal strip 72 which extends radially from the pyrometer axis and is attached to the mica sheet 71.

The strips 70 and 72, the annular mica sheet 71 and insulation covering the metal strips are clamped between the annular portion of the block 10 surrounding the recess 11 and the annular bearing portion of the pyrometer body D adjacent the peripheral wall of the chamber 8, as seen in Fig. 4.

When the temperature of the radiation receiving element 68 of the bolometer is the same as the temperature of the reference element 69 thereof, the electrical resistances of the elements 68 and 69 will be identical. This condition of identical resistance of elements 68 and 69 is an indication that the work strip B and the pyrometer body D are at the same temperature. Variation in the resistance of the element 68 with respect to the resistance of the element 69 indicates a difference in the temperatures of the work strip B and the pyrometer body D and such difference in resistance may be utilized by means of the circuit network shown in Fig. 7 to effect a change in the supply of heat to the work strip B as is required to restore and to maintain the radiation receiving portion 68 and the reference portion 69 of the bolometer at the same temperature.

The circuit network shown in Fig. 7 includes an A. C. bridge 73, an electronic amplifier 74 and a reversible electrical motor 75 controlled by the amplifier 74 and by the bridge network 73. As shown, the motor 75 is mechanically connected to and arranged to adjust a rheostat 76 which is connected in series with the heating coil H within the furnace A and the alternating current supply lines L' and L². The bridge 73, the amplifier 74, the motor 75 and the rheostat 76 thus are utilized in the modified embodiment of our invention in lieu of the controller G of Fig. 4.

The amplifier and motor arrangement shown in Fig. 7 may well be of the type disclosed and claimed in the Wills Patent 2,423,540 which issued on June 8, 1947.

The bridge 73 of Fig. 7 includes the radiation receiving resistance 68 in one arm and the reference resistance 69 in an opposite arm. The bridge 73 includes a resistance 77 in a third arm and a resistance 78 in its fourth arm. Resistances 77 and 78 are fixed in value and of the same resistance. An alternating current voltage is supplied to the bridge 73 by a transformer 79 having a primary winding 80 connected across the alternating current supply lines L' and L² and a secondary winding 81 connected to the energizing terminals 82 and 83 of the bridge 73.

The output terminals 84 and 85 of the bridge are connected across the primary winding 86 of a transformer 87 which is included in the input circuit of the electronic amplifier 74 and includes a secondary winding 88. The electronic amplifier 74 also includes suitable electronic valves as disclosed in the aforementioned Wills Patent 2,423,540 for amplifying the alternating voltage signal which is produced across the terminals of the transformer secondary winding 88 upon unbalance of the bridge 73 and for utilizing the amplified voltage signal to regulate the supply of alternating current to the control winding 89 of the reversible motor 75. As shown, the control winding 89 is shunted by a condenser 90. The motor 75 also includes a power winding 91 which is connected in series with a condenser 92 across the alternating current supply lines L' and L². The motor 75 is characterized in that when alternating current of the same frequency as that of the supply lines L' and L² is supplied to the control winding 89, rotation of its rotor will be effected in one direction or the other depending upon the phase of the alternating current supplied to the winding 89 with respect to the phase of the voltage of the supply lines L' and L². The motor 75 is stationary when no alternating current having the frequency of the supply lines L' and L² is supplied to the winding 89.

With this arrangement, therefore, the motor 75 will be stationary or will rotate in one direction or the other, accordingly as the bolometer resistances 68 and 69 are equal in value or different in resistance. When the resistance of element 68 is greater than the resistance of element 69, motor 75 will rotate in one direction, and the motor will rotate in the opposite direction when the resistance of element 68 is less than that of element 69.

In this embodiment of our invention, as in the embodiments previously described, when the work strip B is at the predetermined selected temperature of the pyrometer body D, the resistances of the elements 68 and 69 are identical and the adjustment of the rheostat 76 by the motor 75 is then that required to maintain a supply of current to the heating coil H of the furnace A needed to maintain said predetermined temperature of the work strip B. Upon a decrease or increase in the temperature of the work strip B and a resultant resistance difference between the bolometer resistance elements 68 and 69, the bridge 73, amplifier 74 and motor 75 quickly operate to vary the current to the heating coil H as is required to return the temperature of the work strip B to approximate equality with the temperature of the pyrometer body D.

As will be apparent, the measurement of the work temperature in the manner described in connection with each embodiment of our invention disclosed herein is essentially a null method of measurement, and in normal use will give the relatively high accuracy which is characteristic of null method measurements of small voltage differences.

While, in accordance with the provisions of the statutes, we have illustrated and described the best form of embodiment of our invention now known to us, it will be apparent to those skilled in the art that changes may be made in the forms of the apparatus disclosed without departing from the spirit of our invention as set forth in the appended claims, and that in some cases certain features of our invention may be used to advantage without a corresponding use of other features.

Having now described our invention, what we claim as new and desire to secure by Letters Patent is:

1. In a system for controlling the temperature of a work surface comprising an illuminator of substantial area disposed in closely spaced relation with the work surface, a heater for said illuminator, means for controlling the energization of said heater to maintain said illuminator at a predetermined temperature, radiant-energy responsive means having a line of sight disposed to view by reflection extended areas of the illuminator and the work surface, said illuminator having a peripheral area differing from the central area thereof for directing to said radiant-energy responsive means energy received by said peripheral area, said peripheral area having a formed surface the elements of which are oriented for reflection of radiant energy in a predetermined direction, and means responsive to the output of said radiant-energy responsive means for maintaining the temperature of the work surface at substantially the same temperature as that of said illuminator.

2. A system for controlling the temperature of a work surface comprising an illuminator of substantial surface area capable of emitting and reflecting radiant energy disposed in closely spaced relation with the work surface to permit multiple reflections of radiant energy therebetween, a heater for said illuminator, means for controlling the energization of said heater to maintain said illuminator at a predetermined temperature, said illuminator having an opening therethrough, a radiation pyrometer disposed at an angle to the work surface to view through said opening an area of the work surface to receive the radiant energy emitted and reflected therefrom, said illuminator having a peripheral area with a sawtooth profile for minimizing loss of radiation from between said surfaces, and means responsive to the output of said radiation pyrometer for maintaining the temperature of the work surface at substantially the same temperature as that of said illuminator.

3. A system for controlling the temperature of a work surface comprising an illuminator having a substantial surface area disposed in closely spaced relation with the work surface, a heater for said illuminator, means for controlling the energization of said heater to maintain said illuminator at a predetermined temperature, radiant-energy responsive means having a line of sight disposed to view by reflection extended areas of said illuminator surface and said work surface, said illuminator having a peripheral area having serrations providing multiple faces for reflecting external radiant energy away from the space between said illuminator and said work surface and for redirecting between said surfaces radiant energy originating from them, and means responsive to the output of said radiant-energy responsive means for maintaining the temperature of the work surface at substantially the same temperature as that of said illuminator.

4. The combination set forth in claim 3 in which the emissivity of said illuminator is of the same order as that of the work surface.

5. The combination set forth in claim 3 in which the surface of the central area of said illuminator is highly polished to increase the reflectance of said surface.

6. A system for controlling the temperature of a work surface comprising an illuminator having a substantially concave surface area disposed in closely spaced relation with the work surface, a heater for said illuminator, means for controlling the energization of said heater to maintain said illuminator at a predetermined temperature, radiant-energy responsive means having a line of sight disposed to view by reflection extended areas of said illuminator surface and said work surface, said illuminator having a peripheral area having multiple faces for reflecting external radiant energy away from the space between said illuminator and said work surface and for redirecting between said surfaces radiant energy originating from them, and means responsive to the output of said radiant-energy responsive means for maintaining the temperature of the work surface at substantially the same temperature as that of said illuminator.

7. A system for accurately controlling the temperature of a work surface in accordance with a predetermined temperature and in avoidance of deviation therefrom due to variations in the emissivity of the work surface, comprising an illuminator spaced from the work surface and having a substantial surface of less than unity emissivity, means supporting said illuminator surface in closely spaced relation with said work surface for increasing the intensity of radiant energy therebetween by multiple reflection thereof, said illuminator having an opening therethrough, radiant-energy responsive means disposed to view through said opening an area of said work surface directly opposite said illuminator, heating means for said illuminator for supplementing the emitted and multiply reflected radiant energy between said illuminator surface and said work surface to bring the intensity of the radiant energy received by said radiant-energy responsive means from said area to that value which would be emitted by a blackbody at said predetermined temperature, means for controlling said heating means to maintain said illuminator at said predetermined temperature, said illuminator having a peripheral area provided with serrations for minimizing loss of radiation from between said surfaces, and means responsive to the output of said radiant-energy responsive means for maintaining the temperature of said work surface at substantially the same temperature as that of said illuminator.

8. A system for controlling the temperature of a moving work surface comprising supporting means for maintaining a portion of the work surface in a substantially flat plane, an illuminator of substantial area disposed in closely spaced relation with the work surface, a heater for said illuminator, means for controlling the energization of said heater to maintain said illuminator at a predetermined temperature, radiant-energy responsive means supported by said illuminator and having a line of sight disposed to view by reflection extended areas of the illuminator and the work surface, means for retaining between the work surface and said illuminator radiant energy for multiple reflection therebetween comprising a peripheral area surrounding the central region of said illuminator characterized by a plurality of serrations which are arranged to minimize egress of radiant energy from between said illuminator and work surface and for minimizing ingress of radiant energy externally of the region between said illuminator and the work surface, and means responsive to the output of the said radiant-energy responsive means for maintaining the temperature of the work surface at substantially the same temperature as that of said illuminator.

9. For a pyrometer system, an illuminator having a surface of substantial area spaced from and cooperating with a heated work surface to provide a measuring zone therebetween, heater means for said illuminator surface, radiant-energy responsive measuring means disposed to view by reflection extended areas of the illuminator and work surfaces, said illuminator surface having a peripheral area which surrounds a concave central area and is characterized by a plurality of serrations which minimize egress of radiant energy from between said illuminator and work surface and minimize ingress of radiant energy externally of the region between said illuminator and said work surface, and means controlled to establish equality of the temperatures of said closely spaced heated surfaces for measurement under blackbody conditions.

10. An illuminator having a substantial surface area for disposition in closely spaced relation to a heated work surface to provide a measuring zone therebetween, said zone having blackbody characteristics as viewed by a pyrometer having a line of sight disposed to view by reflection extended areas of said illuminator and work surfaces, a heater for said illuminator, said illuminator having a peripheral area having serrations providing multiple faces, part of said multiple faces being oriented for reflecting external radiant energy away from said measuring zone, the remainder of said faces being oriented for redirecting energy radiated from said viewed extended areas inwardly of said measuring zone.

References Cited in the file of this patent

UNITED STATES PATENTS

| | | |
|---|---|---|
| 2,275,265 | Mead | Mar. 3, 1942 |
| 2,312,022 | Brooks | Feb. 23, 1943 |
| 2,357,193 | Harrison | Aug. 29, 1944 |
| 2,438,160 | Green | Mar. 23, 1948 |
| 2,562,538 | Dyer | July 31, 1951 |

OTHER REFERENCES

Head, article in "Instruments" magazine for January 1944, pp. 36 through 40.

Harrison, article in "Instrumentation" issue of July–August 1945, pages 7 and 8 published by Brown Instrument Co., Philadelphia, Pa.

Instruments, pages 417 and 418 of "Instruments" magazine dated May 1948.